US006863767B2

(12) United States Patent
Bersuch et al.

(10) Patent No.: US 6,863,767 B2
(45) Date of Patent: *Mar. 8, 2005

(54) PASTE-BOND CLEVIS JOINT

(75) Inventors: Larry R. Bersuch, Fort Worth, TX (US); Dan V. Heap, Fort Worth, TX (US); Ross A. Benson, Willow Park, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 121 days.

This patent is subject to a terminal disclaimer.

(21) Appl. No.: 09/938,065

(22) Filed: Aug. 23, 2001

(65) Prior Publication Data

US 2003/0037867 A1 Feb. 27, 2003

(51) Int. Cl.⁷ .............................................. B32B 31/04
(52) U.S. Cl. ..................... 156/293; 156/286; 156/289; 156/303.1; 156/306.9; 156/307.1
(58) Field of Search ............................ 156/303.1, 289, 156/293, 306.9, 307.1, 285, 286; 264/338

(56) References Cited

U.S. PATENT DOCUMENTS

| | | | | |
|---|---|---|---|---|
| 4,671,470 A | | 6/1987 | Jonas ........................ 244/199 |
| 4,946,369 A | * | 8/1990 | Beck et al. ................. 427/133 |
| 4,966,802 A | * | 10/1990 | Hertzberg ................... 428/119 |
| 5,052,906 A | * | 10/1991 | Seemann .................... 425/112 |
| 5,476,704 A | | 12/1995 | Köhler |
| 5,487,930 A | | 1/1996 | Lockshaw et al. ............ 428/53 |
| 5,580,622 A | | 12/1996 | Lockshaw et al. ......... 428/34.1 |
| 5,725,709 A | | 3/1998 | Jensen |
| 6,007,894 A | * | 12/1999 | Barnes et al. ............... 428/120 |
| 6,306,239 B1 | * | 10/2001 | Breuer et al. ............... 156/245 |
| 6,374,570 B1 | * | 4/2002 | McKague, Jr. ............... 52/762 |

FOREIGN PATENT DOCUMENTS

| | | | | |
|---|---|---|---|---|
| DE | 19832441 C1 | * | 1/2000 | .......... B29C/70/42 |
| WO | WO 98/50214 | * | 11/1998 | .......... B29C/43/36 |

OTHER PUBLICATIONS

*Tension Pull–off and Shear Test Methods to Characterize 3–D Textile Reinforced Bonded Composite Tee–Joints*; Owens et al., published 2000 Composite Structures, Theory and Practice, Editors: Peter Grant and Carl Q. Rosseau.

*Primary Sandwich Structure, A Unitized Approach*; Sheahen et al.; copyright 2000 by Lockheed Martin; Published by the American Institute of Aeronautics and Astronauts, Inc.; pp. 1–8.

*Robust Composite Sandwich Structures*; Sheahen et al.; copyright 1998 by Lockheed Martin; Published by the American Institute of Aeronautics and Astronauts, Inc.; pp. 1–12.

(List continued on next page.)

Primary Examiner—Gladys JP Corcoran
(74) Attorney, Agent, or Firm—Bracewell & Patterson, L.L.P.

(57) ABSTRACT

A method is provided for using a three-dimensional, Pi-shaped, woven preform to assemble first and second composite components. The preform is infused with resin, and at least one surface of the preform is adhered to at least one surface of the first component using a film adhesive. The preform is cured while an oversized tool coated with non-stick material is located within a clevis formed by two legs of the preform. A removable peel ply is located between the tool and the clevis, and semi-rigid over-presses are used during curing. After curing, the tool, over-presses, and peel ply are removed, and adhesive is injected into the clevis. The second component is inserted into the clevis, the adhesive adhering to an inner surface of the clevis and to at least one surface of the second component for retaining the second component within the clevis, the second component having a smaller width than the tool.

18 Claims, 1 Drawing Sheet

OTHER PUBLICATIONS

*Affordable Composite Structure for Next Generation Fighters*; Bersuch et al.; copyright 1998 by Lockheed Martin; published by Society for the Advancement of Material and Process Engineering; pp. 1–11.

*Interlaminar Reinforced Composites Development for Improved Damage Tolerance*; Wanthal et al; copyright 200 by the Boeing Company, Lockheed Martin; Northrop Grunman; Society for the Advancement of Material and Process Engineering; 15 pages.

*3–D Composites in Primary Aircraft Structure Joints*;; Bersuch et al.; published Jan. 1997 AGARD Bolted/Bonded Joints in Polymeric Composites ; pp. 16–1 –16–10.

*Affordable 3–D Integrated Composite Structures*; Sheahen et al.; copyright 2000 by Lockheed Martin; published by the Universal Technology Corporation; 20 pages.

U.S. Appl. No. 09/899,633, filed Jul. 2, 2001, entitled *"Adhesive–Infused Textile Preforms for Structural Joints."*, inventor Schmidt.

U.S. Appl. No. 09/973,208, filed Oct. 9, 2001, entitled *"Co–Bonded Joint With Z–Pins"*, inventors Benson, et al.

U.S. Appl. No. 09/946,627, filed Aug. 31, 2001, entitled *Co–Cured Joint With Z–Pins*, inventors, Bersuch et al.

U.S. Appl. No. 09/761,301, filed Jan. 16, 2001, entitled *"System and Method of Forming Structural Assemblies with 3–D Woven Joint Pre–Forms"*, inventor Schmidt.

* cited by examiner

PASTE-BOND CLEVIS JOINT

BACKGROUND OF THE INVENTION

1. Field of the Invention

This invention generally relates to assembly of components using woven preforms and particularly relates to assembly using a paste adhesive within a clevis of a cured preform.

2. Description of the Prior Art

Typical methods known in the art for attaching a composite skin to a composite web include forming the web as an "I" or "C" shape, making them more complex and expensive to fabricate. The flanged sections are fastened to adjacent sections using methods similar to those used with metal components, for example, by using fasteners. However, use of the fasteners adds weight and cost to the joints.

Also, these joints have difficulty withstanding out-of-plane loading. Typical remedies for this are thick laminate stack-ups using many layers of composite fabric and having large flange radii. While this reduces the tensions forces between the layers of the flanged section, the result is a heavy joint, reducing the weight savings realized when using composites.

SUMMARY OF THE INVENTION

A woven preform transfers out-of-plane loading through directed fibers to minimize inter-laminar tension. The preform is cured in position on the skin, the web being inserted during final assembly into a clevis formed by the preform. Composite substructure components can be fabricated having flat, bladed webs, which reduces complexity and cost of fabrication. The result is an efficient way to assemble composite parts without the use of fasteners or flanged sections.

A method is provided for using a three-dimensional, Pi-shaped, woven preform to assemble first and second composite components. The preform is infused with resin, and at least one surface of the preform is adhered to at least one surface of the first component using a film adhesive. The preform is cured while an oversized tool coated with non-stick material is located within a clevis formed by two legs of the preform. A removable peel ply is located between the tool and the clevis, and semi-rigid over-presses are used during curing to distribute inwardly-directed forces across the preform. After curing, the tool, over-presses, and peel ply are removed, and adhesive is injected into the clevis. The second component is inserted into the clevis, the adhesive adhering to an inner surface of the clevis and to at least one surface of the second component for retaining the second component within the clevis, the second component having a smaller width than the tool.

BRIEF DESCRIPTION OF THE DRAWINGS

The novel features believed to be characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
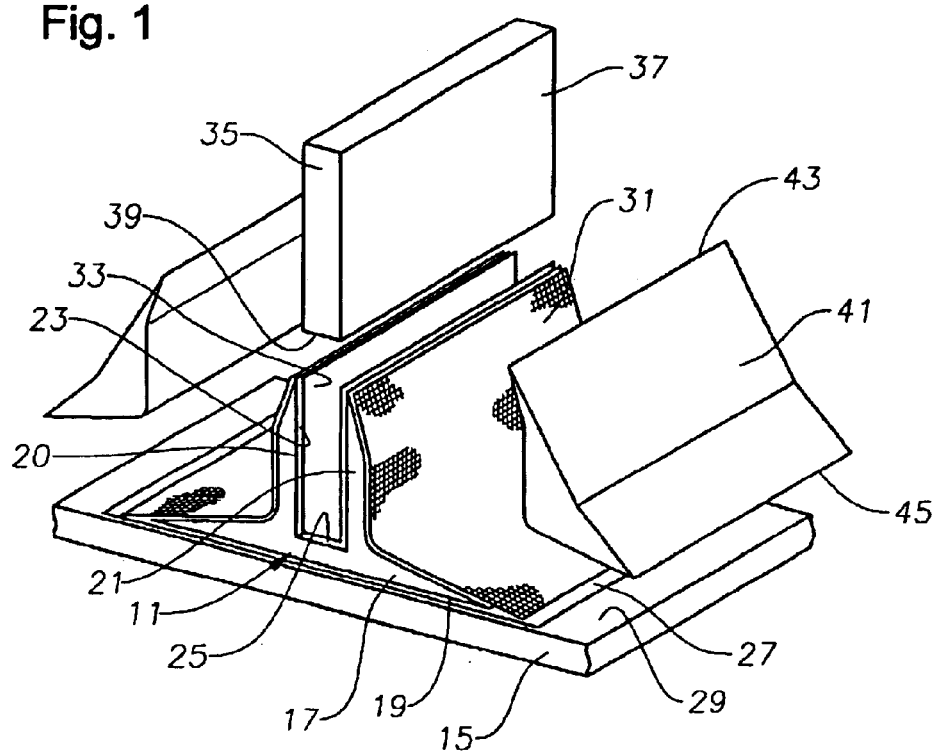
FIG. 1 is a perspective view of an assembly using a preform and in accordance with the present invention.
Figure 2:
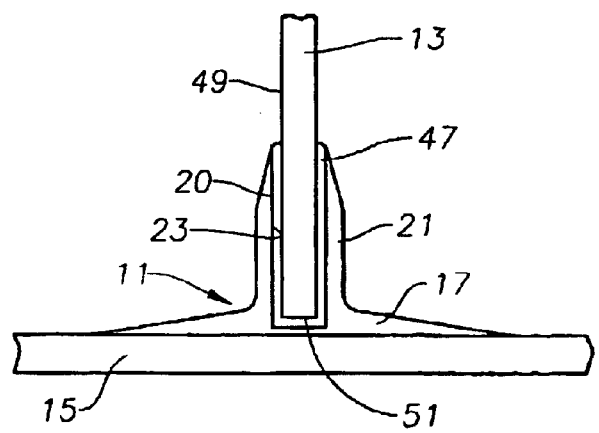
FIG. 2 is a front view of the preform of FIG. 1 after installation.

FIGS. 1 and 2 show a pi-shaped, 3-D, woven preform 11 used to connect two composite parts 13, 15, which may be, for example, a frame member 13 and a skin 15, or other member. Preform 11, frame 13, and skin 15 are infused with a resin, for example, 977-3, available from Cytec Industries, Inc. of West Paterson, N.J. Preform 11 is not cured prior to assembly. Frame 13 is cured prior to assembly, and skin 15 may be cured prior to preform 11 being adhered to skin 15. Alternatively, skin 15 and preform 11 may be co-cured as an assembly. Preform 11 may be woven from materials such as carbon fibers, Kevlar fibers, glass fibers, or other materials, or may be a combination of material types.

As shown in the figures, preform 11 has a base 17 on its lower portion that has a continuous, flat lower surface 19. A pair of spaced-apart planar legs 21 extend vertically upward from base 17, forming a clevis 20, or slot. Each leg 21 is at a position that is offset from, but near to, the center of base 17. Legs 21 are shown as parallel to each other and perpendicular to base 17, though legs 21 could be at angles to each other and to base 17. Legs 21 could be oriented to be farther apart at the top of legs 21, forming a "V" shape. In the installed position shown, inner surfaces 23 of legs 21 face each other for receiving frame member 13. A small, upward-facing surface 25 of base 17 lies between the lower ends of legs 21. Though it is preferable for the outer surface of legs 21 and the upper surface of base 17 to be tapered at their outer ends, as shown, the ends may also be squared.

FIG. 1 is an exploded view of the components used to form the desired shape when curing preform 11. Here, skin 15 has been cured prior to assembly. An adhesive film 27, for example, AF191, available from 3M of St. Paul, Minn., is placed between lower surface 19 of preform 11 and upper surface 29 of skin 15 for adhering preform 11 to skin 15.

Various resin systems are sold under the terms "laminating resins" and "adhesives," though there is no "bright-line, "industry-standard definition by which to distinguish one from the other. The term "adhesive" is used herein to mean a resin system that has a lower modulus of elasticity and/or a higher strain-to-failure than the resin forming the matrix of the parts to be adhered. The combination of these characteristics is described as higher toughness, and adhesives have a higher toughness than laminating resins, which tend to be more brittle and have lower crack-formation loads.

Results from ASTM tests can be used to distinguish, generally, between laminating resins and adhesives. High-strength, structural laminating resins have a peel strength rating generally ranging from 0–15 pounds per linear inch, whereas the peel strength of adhesives are greater than 15 pounds per linear inch. For example, the Bell Peel test (ASTM D3167 "Standard Test Method for Floating Roller Peel Resistance of Adhesives") shows that the peel strength of AF191 is 30–45 pounds per linear inch at room temperature, but the peel strength of 977-3, which is used to laminate the parts, is 0–6 pounds per linear inch. In addition, laminating resins generally have a tensile strength greater than 7500 pounds per square inch (psi) as tested using ASTM D638 ("Standard Test Method for Tensile Properties of Plastics"), with high-strength resins ranging to 10000 psi. Adhesives generally have tensile strengths lees than 6500 psi. Thus, in the present application, "adhesives" also means resin systems with tensile strengths less than 6500 psi and a peel strength greater than 15 pounds per linear inch. "Laminating resins" is used to mean resin systems having tensile strengths greater than 7500 psi and a peel strength of less than 15 pounds per linear inch.

A resin-infused textile layer forms an over-wrap ply 31 and is laid on the outer surface of each leg 21 and on the outer ends of the upper surface of base 17, over-wrap ply 31 extending beyond the outer ends of base 17. Over-wrap ply 31 provides an additional connective layer between preform 11 and skin 15. Adhesive film 27 extends to or beyond the outermost edge of the lower portions of over-wrap plies 31. Each over-wrap ply 31 extends upward to the upper edge of leg 21. A peel ply 33, a fabric layer preferably made from Kevlar, is inserted between legs 21, peel ply 33 clinging to uncured resin on inner surfaces 23 of legs 21. Peel ply 33 is removed prior to assembly with frame 13 (FIG. 2), ensuring a clean bonding surface within clevis 20. Peel ply 33 allows for easier removal of shaping tool 35 after curing of preform 11.

Tool 35 is shown as planar and having a rectangular cross-section sized to have a larger lateral width than that of frame 13, though tool 35 can also be tapered when necessary for the desired shape. The oversize width, preferably 0.002" to 0.120" wider than frame 13, provides for a gap or clearance between frame 13 and inner surfaces 23 of legs 21 when frame 13 is inserted into clevis 20. Tool 35 is coated with Teflon on surfaces 37, 39 to ensure a minimum of force is necessary to remove tool 35 after curing of preform 11. Surfaces 37, 39 contact peel ply 33 and shape the volume between legs 21. Semi-rigid over-presses 41 are used to distribute force applied to over-presses 41 across the width and height of preform 11, surfaces 43, 45 being in contact with over-wrap plies 31. Each over-press 41 is generally triangular in cross-section. The distribution of force causes more consistent bonding at the interface of skin 15 and preform 11 and a more consistent shaping of clevis 20 to the shape of tool 35.

To assemble skin 15 and frame 13, preform 11 is infused with resin, and adhesive film 27 is placed on upper surface 29 of skin 15. Adhesive film 27 and preform 11 are tacky, the resin remaining in preform 11. Lower surface 19 of preform 11 is placed against adhesive film 27 in the desired position. Adhesive film 27 forms a bonding layer at the interface of lower surface 19 of preform 11 and upper surface 29 of skin 15. Over-wrap plies 31 are infused with resin and laid on the outer surfaces of base 17 and legs 21, the over-wrap plies 31 extending upward to the edges of legs 21 and laterally outward beyond the outer edges of base 17. Adhesive film 27 extends to or beyond the outer edge of each over-wrap ply 31 and bonds the outer portion of plies 31 to skin 15.

A peel ply 33 is inserted between legs 21, the peel ply 33 clinging to the uncured resin on inner surfaces 23 of legs 21 and on surface 25, surfaces 23, 25 forming the inside of clevis 20. Oversized tool 35, which is coated with a non-stick material, is inserted into clevis 20 and over-presses 39 are placed against the over-wrap plies 31. The assembly and tooling are placed within a vacuum bag (not shown) from which the air is drawn, allowing outside air pressure to apply force to over-presses 39. This forces base 17 toward skin 15 and forces legs 21 toward tool 35, causing preform 11 to take the desired shape. The assembly is preferably placed into an oven to cure preform 11 and adhesive film 27 concurrently, adhering preform 11 to skin 15.

Referring to FIG. 2, after curing, vacuum bag and over-presses 41 are removed. Tool 35 is removed from clevis 20, and peel ply 33 is peeled from inner surfaces 23 and surface 25. An adhesive 47 that is preferably in a paste form, for example, Hysol® EA 9394, available from Dexter Adhesive Systems of Bay Point, Calif., is injected into clevis 20, and the outer surfaces 49, 51 of frame are wetted with additional adhesive 47. EA 9394 has a maximum peel strength of 20 pounds per linear inch, placing it in the range of the adhesives. Adhesive 47 is thickened into a paste form by adding a thickening agent, causing adhesive 47 to have a high enough viscosity to prevent adhesive 47 from flowing out of clevis 20 even when preform 11 is turned upside down. Frame 13 is inserted into clevis 20, adhesive 47 filling the gap between inner surfaces 23 of legs 21 and surfaces 49 of frame 13 and between surface 25 of preform 11 and surface 51 of frame 13. Since the amount of oversizing of tool 35 determines the amount and thickness of adhesive 47 remaining between frame 13 and inner surfaces 23 after insertion of frame 13, the width of tool 35 will be determined from the assembly tolerance requirements and by the strength required in the joint. Mechanical pressure is applied to maintain the proper positioning of parts 13, 15, and adhesive 47 is cured to form a bonding layer between cured preform 11 and frame 13. Though EA 9394 cures at room temperature, local heat can be applied when necessary to cure the paste adhesive used. FIG. 2 shows a completed assembly, frame 13 being secured to skin 15.

The advantages of the present invention include the ability to form an assembly of composite components using a clevis joint and without using fasteners. By forming the clevis with a three-dimensional woven preform, the need for fasteners is eliminated. Also, the method provides for a means of installing a composite closeout panel or other component when the backside of the joint is not accessible for vacuum-bagging. For example, the present invention is useful in creating wing structures in two halves and then bonding the halves, the devises being on one half of the wing structure, the frame webs being on the other half.

While the invention has been shown in only some of its forms, it is not thus limited but is susceptible to various changes and modifications without departing from the spirit thereof.

We claim:

1. A method for assembling first and second composite components, the method comprising:
   (a) providing a woven preform having a base and a pair of spaced-apart legs extending from the base;
   (b) infusing the preform with resin, and adhering the base of the preform to the first component;
   (c) inserting a sizing tool between the legs and curing the resin while the tool is located between the legs to define a slot; and
   (d) removing the tool and applying an adhesive into the slot; then
   (e) inserting the second component into the slot, the adhesive in the slot adhering at least one surface of the second component to at least one inner surface of the slot for retaining the second component within the slot, the second component having a smaller width than the tool.

2. The method of claim 1, wherein:
   step (b) further comprises locating a film adhesive between the base of the preform and the first component.

3. The method of claim 1, wherein:
   step (c) further comprises locating a peel ply within the slot, the peel ply separating the tool and the preform and being removable from the slot after the tool is removed.

4. The method of claim 1, further comprising:
   coating the tool with a non-stick material to prevent adhesion of the tool to the legs and to reduce the force needed to remove the tool after curing of the preform.

5. The method of claim 1, wherein:
step (c) further comprises placing semi-rigid over-presses against outer surfaces of the base and the legs of the preform and placing the first component, the preform, the over-presses and the tool within a vacuum bag while curing the preform, each of the over-presses being generally triangular in cross-section for distributing a force across the preform.

6. The method of claim 1, further comprising:
adhering an over-wrap ply to the preform.

7. The method of claim 1, wherein:
steps (c) further comprises forming the legs to be perpendicular to the base.

8. The method of claim 1, wherein:
steps (c) further comprises forming the legs to be parallel to each other.

9. The method of claim 1, wherein:
step (c) further comprises vacuum bagging the first components and preform to ensure proper sizing and bonding.

10. The method of claim 1, wherein:
the tool has a greater width than the second component, providing a clearance for the adhesive in the slot.

11. The method of claim 1, wherein:
step (d) further comprises coating inside surfaces of the legs with the adhesive.

12. A method for assembling first and second composite components, the method comprising:
 (a) providing a three-dimensional, woven preform having a base and a pair of spaced-apart, generally-parallel legs extending from the base; then
 (b) infusing the preform with resin, and adhering at least one surface of the preform to at least one surface of the first component using a film adhesive; then
 (c) inserting a sizing tool between the legs and curing the resin and film adhesive while the tool is located between the legs to define a slot and bond the preform to the first component; then
 (d) removing the tool and applying a paste adhesive into the slot, the paste adhesive coating inside surfaces of the legs; and
 (e) inserting the second component into the slot, the paste adhesive adhering at least one surface of the second component to at least one inner surface of the slot for retaining the second component within the slot, the second component having a smaller width than the tool.

13. The method of claim 12, further comprising:
step (c) comprises locating a peel ply within the slot, the peel ply being between the tool and the preform and being removable from the slot after the tool is removed.

14. The method of claim 12, further comprising:
coating the tool with a non-stick material to reduce the force needed to remove the tool after curing of the preform.

15. The method of claim 12, wherein:
step (c) further comprises placing semi-rigid over-presses against outer surfaces of the base and the legs of the preform and placing the preform, the first component, the tool and the over-presses within a vacuum bag while curing the preform, the over-presses being generally triangular in cross-section for distributing a force across the preform.

16. The method of claim 12, further comprising:
adhering an over-wrap ply to the preform and to the adhesive film.

17. The method of claim 12, wherein:
step (c) further comprises vacuum bagging the first components and preform to ensure proper sizing and bonding.

18. A method for assembling first and second composite components, the method comprising:
 (a) providing a three-dimensional, woven preform having a base and a pair of spaced-apart parallel legs extending from the base;
 (b) infusing the preform with resin, and adhering the base of the preform to at least one surface of the first component using a film adhesive, the first component being a composite member that is pre-cured;
 (c) inserting a peel ply between the legs and inserting a tool within the peel ply between the legs; then
 (d) placing semi-rigid over-presses against outer surfaces of the base and the legs of the preform and placing the first component, the preform, the over-presses and the tool within a vacuum bag and curing the resin and film adhesive while the tool is located between the legs to define a clevis and bond the preform to the first component, the legs being perpendicular to the base; then
 (e) removing the tool, removing the peel ply, and applying a paste adhesive into the clevis; and
 (f) inserting the second component into the clevis, the second component being a composite member that is pre-cured, the paste adhesive adhering at least one surface of the second component to at least one inner surface of the clevis for retaining the second component within the clevis, the second component having a smaller width than the tool.

* * * * *

UNITED STATES PATENT AND TRADEMARK OFFICE
CERTIFICATE OF CORRECTION

PATENT NO. : 6,863,767 B2  Page 1 of 1
APPLICATION NO. : 09/938065
DATED : March 8, 2005
INVENTOR(S) : Larry R. Bersuch et al.

It is certified that error appears in the above-identified patent and that said Letters Patent is hereby corrected as shown below:

In the Specification:

Column 3, line 23, delete "39" and insert --41--
Column 3, line 25, delete "39" and insert --41--
Column 3, line 51, delete "39" and insert --41--
Column 3, line 55, delete "39" and insert --41--

Signed and Sealed this

Twenty-fourth Day of June, 2008

JON W. DUDAS
*Director of the United States Patent and Trademark Office*